United States Patent [19]
Abthoff et al.

[11] Patent Number: 6,079,394
[45] Date of Patent: Jun. 27, 2000

[54] MECHANICAL SUPERCHARGER FOR AN INTERNAL COMBUSTION ENGINE AND A METHOD OF MAKING SAME

[75] Inventors: Joerg Abthoff, Pluederhausen; Roland Kemmler, Stuttgart; Adolf Kremer, Remseck; Reinhard Steinkaemper, Winnenden, all of Germany

[73] Assignee: DaimlerChrysler AG, Stuttgart, Germany

[21] Appl. No.: 09/216,948

[22] Filed: Dec. 21, 1998

[30] Foreign Application Priority Data

Dec. 20, 1997 [DE] Germany .......................... 197 56 985

[51] Int. Cl.[7] .................................................... F02B 33/00
[52] U.S. Cl. ........................................ 123/559.1; 123/563
[58] Field of Search .................................. 123/559.1, 563

[56] References Cited

U.S. PATENT DOCUMENTS 4,214,443  7/1980  Herenius .
5,440,881  8/1995  Sudmanns et al. .
5,448,928  9/1995  Arakawa et al. .

FOREIGN PATENT DOCUMENTS 41 03 870 C2  8/1991  Germany .

*Primary Examiner*—Noah P. Kamen
*Attorney, Agent, or Firm*—Evenson, McKeown, Edwards & Lenahan, P.L.L.C.

[57] ABSTRACT

An internal combustion engine having a mechanical supercharger for compressing the combustion air in the intake manifold. The supercharger communicates with a charge-air cooler which is arranged downstream in the direction of flow of the combustion air and is connected to the intake manifold. In order to design an internal combustion engine in such a way that as few alterations to the basic engine as possible are required for the arrangement of the supercharger, the supercharger, the charge-air cooler and the intake manifold are formed as an interchangeable supercharger module held on a support plate.

30 Claims, 7 Drawing Sheets

MECHANICAL SUPERCHARGER FOR AN INTERNAL COMBUSTION ENGINE AND A METHOD OF MAKING SAME

BACKGROUND OF THE INVENTION

This application claims the priority of German Application No. 197 56 985.4, filed Dec. 20, 1997, the disclosure(s) of which is (are) expressly incorporated by reference herein.

The invention relates to an internal combustion engine having a mechanical supercharger for compressing combustion air in the intake manifold.

DE 41 03 870 C2 discloses an internal combustion engine which has a mechanical supercharger to increase power and torque. The supercharger is arranged in the intake tract of the internal combustion engine and compresses the combustion air fed to the combustion chamber. As a result, charging efficiency of the internal combustion engine is increased. Arranged downstream of the supercharger is a charge-air cooler, which reduces the combustion-air temperature increased as a result of the compression. After passing through the charge-air cooler, the combustion air is fed to the intake manifold of the internal combustion engine.

In order to reduce the production and assembly costs, it is normal practice, starting from a basic model, to realize different engine variants by modifying certain engine components. The power and torque of the basic model may be increased, for example, by installing the supercharger described above. The supercharger, including the charge-air cooler, must be attached to the intake manifold of the internal combustion engine in a pressure-tight manner in order to permit the desired supercharging of the combustion air. A problem here is that the geometry of the intake manifolds of different engine variants is of varying configuration. The intake manifold must therefore also be adapted when installing a supercharger into the basic model. As a consequence of the effort required for the assembly of the individual components, the costs for the modification of the basic model may also increase.

SUMMARY OF THE INVENTION

The invention addresses the underlying problem by providing a design to an internal combustion engine requiring as few alterations to the basic engine as possible for the arrangement of a mechanical supercharger.

As such, the present invention is directed to an internal combustion engine having a mechanical supercharger communicating with a charge-air cooler. The mechanical supercharger, charge-air cooler and intake manifold are formed as an interchange unit.

The modular construction of supercharger, charge-air cooler and intake manifold on a support plate enables the basic engine to be upgraded quickly. The prefabricated supercharger module is used instead of the intake manifold intended for the basic model, so that, compared with the basic model, no alteration costs arise during assembly. The laborious arranging of the individual supercharger components on the internal combustion engine is dispensed with and problems with the connecting or fitting of the various components are avoided.

The supercharger and the charge-air cooler are expediently arranged on different sides of the support plate. In this case, the outlet side of the supercharger is connected to the inlet side of the charge-air cooler via an opening in the support plate. In this design, the supercharger module requires only a small construction space. In addition, the supercharger and the charge-air cooler are connected to one another over the shortest possible distance, so that no long pipe connections are required.

The supercharger may also be fastened to the intake manifold via fastening lugs instead of on a support plate. The charge-air cooler is then screwed directly to the supercharger.

Advantageously provided on the admission side of the supercharger is an air ducting line that is part of the supercharger module and via which the supercharger is connected to the air filter of the internal combustion engine. Furthermore, the throttle valve may be preassembled on the supercharger module on the admission side of the supercharger. A fuel line may also be provided on the supercharger module, so that variant-specific adaptations to the intake duct may be dispensed with.

Other objects, advantages and novel features of the present invention will become apparent from the following detailed description of the invention when considered in conjunction with the accompanying drawings.

BRIEF DESCRIPTION OF THE DRAWINGS

Further advantages and expedient embodiments of the present invention will become apparent from the following claims, detailed description of the invention and the drawings, wherein:

DETAILED DESCRIPTION OF THE DRAWINGS

Figure 1:
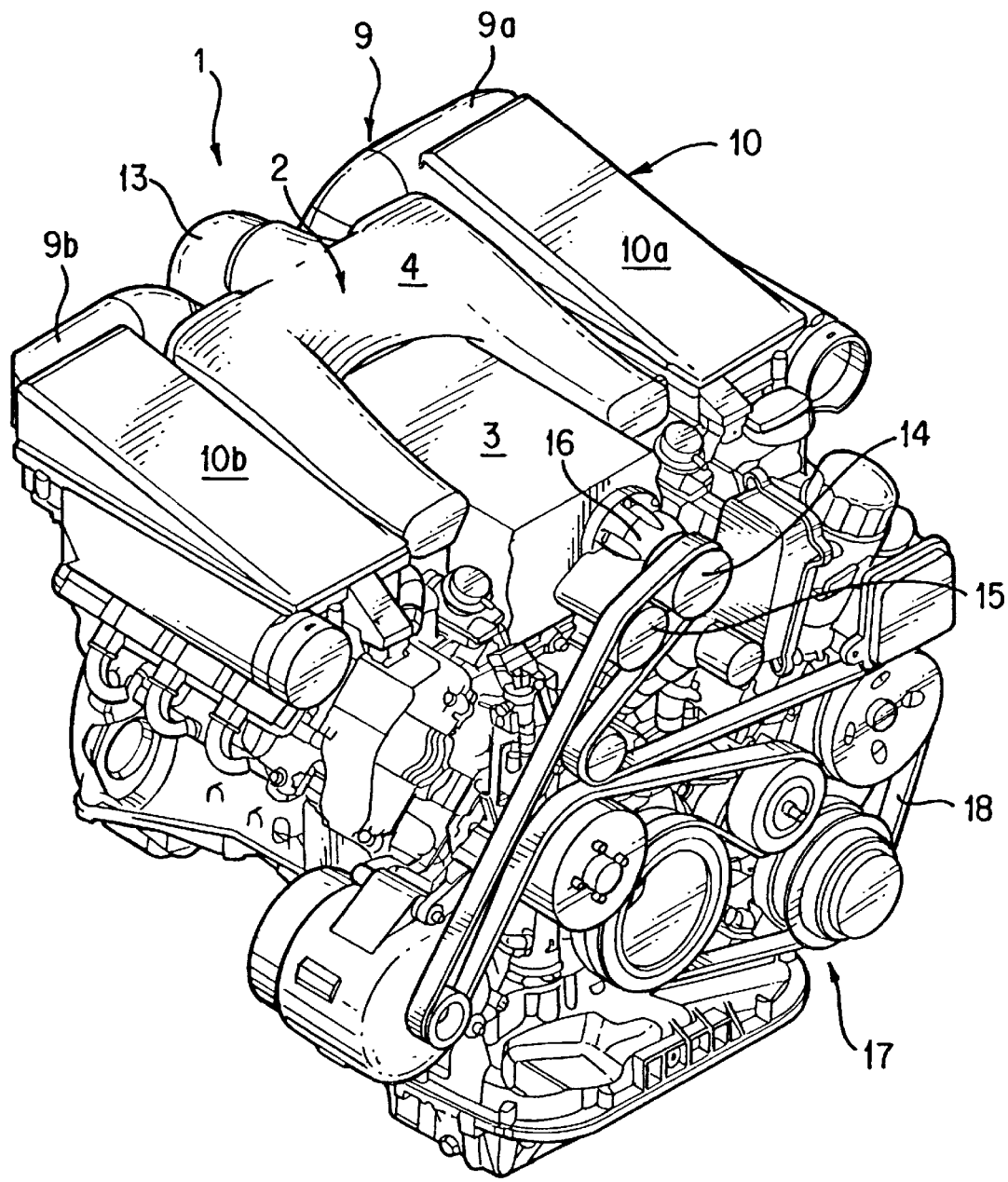
FIG. 1 shows a perspective view of an internal combustion engine having a supercharger module.
Figure 2:
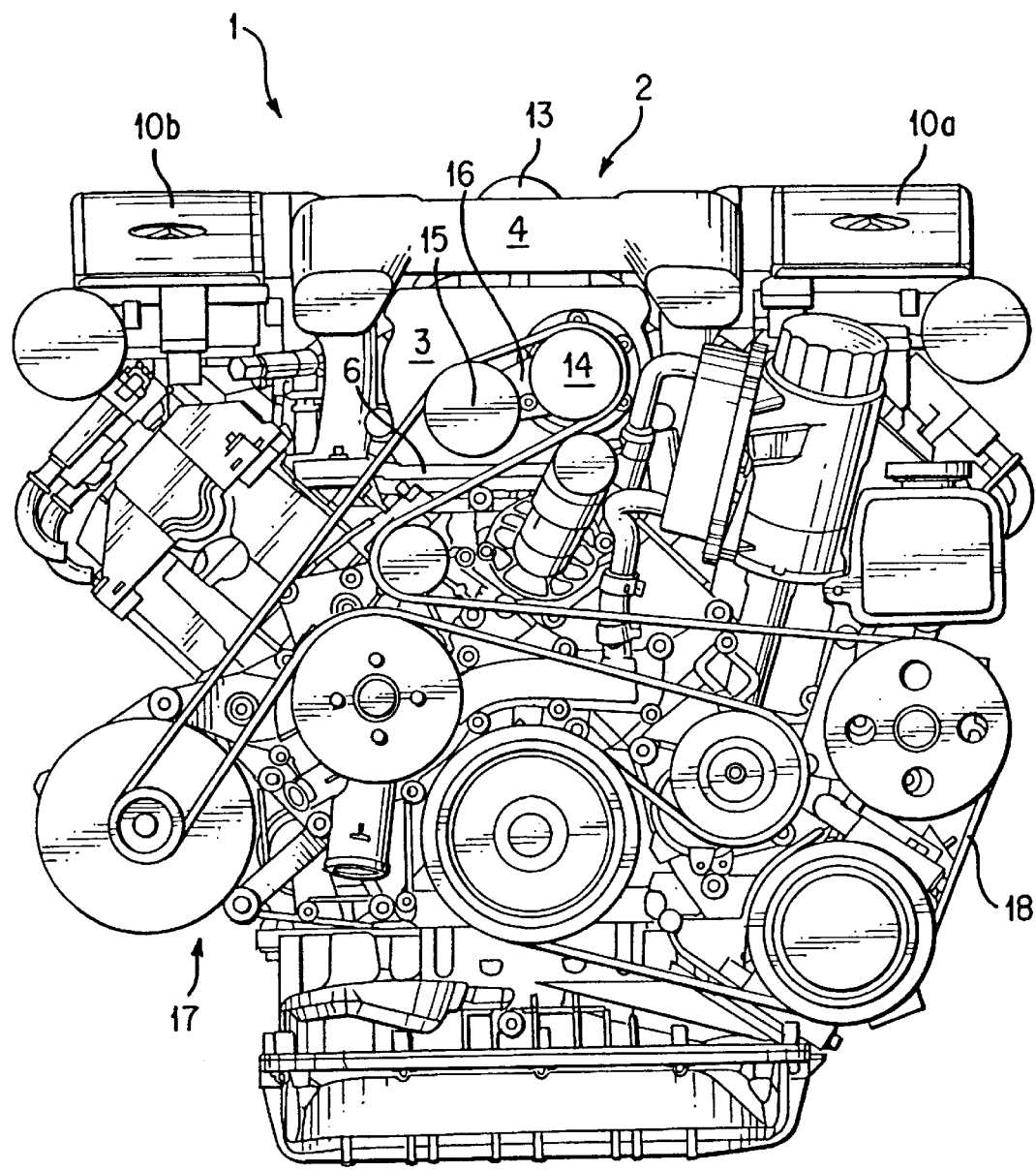
FIG. 2 shows a side view of the internal combustion engine.

The internal combustion engine 1 shown in FIGS. 1 and 2, for example a spark-ignition or compression-ignition internal combustion engine, has a mechanically driven supercharger 3, in particular a compressor supercharger. The supercharger 3 compresses the combustion air. This compression provides an increase in the filling-air mass in the combustion chamber and the proportion of fuel can also be increased as well as on increase in the power or torque. The combustion air is fed to the supercharger 3 via line sections 9a, b of an air ducting line 9 from an air filter 10 having two housing sections 10a, b. The compressed air compressed in the supercharger 3 is fed via a second air ducting line 13 to the intake manifold 4 and from there to the combustion chambers of the cylinders.

The supercharger 3 is driven via its driving pulley 14 by means of a belt 18 by the auxiliary-unit drive 17. The auxiliary-unit drive 17 is operated by the crankshaft of the internal combustion engine 1. Furthermore, a deflection pulley 15 for the belt 18 is provided. Deflection pulley 15 is arranged parallel to the axis of the driving pulley 14 of the supercharger 3 and is held on the driving-spindle bearing arrangement 16 of the driving pulley 14 as shown in FIGS. 2 and 3.

According to one embodiment of the invention, the supercharger 3 is part of a supercharger module 2. Supercharger module 2 further comprises the intake manifold 4 and the charge-air cooler 5 (shown in FIG. 6) for cooling the compressed combustion air. These components of the supercharger module 2 are arranged on or alternatively connected to a support plate 6. The supercharger module 2 can be assembled onto a basic model of an internal combustion engine as a prefabricated and independent, self-contained subassembly that can be screwed to the internal combustion engine. The supercharger module 2 replaces the intake manifold of the basic model and no further modifications to the basic model being necessary.

Figure 3:
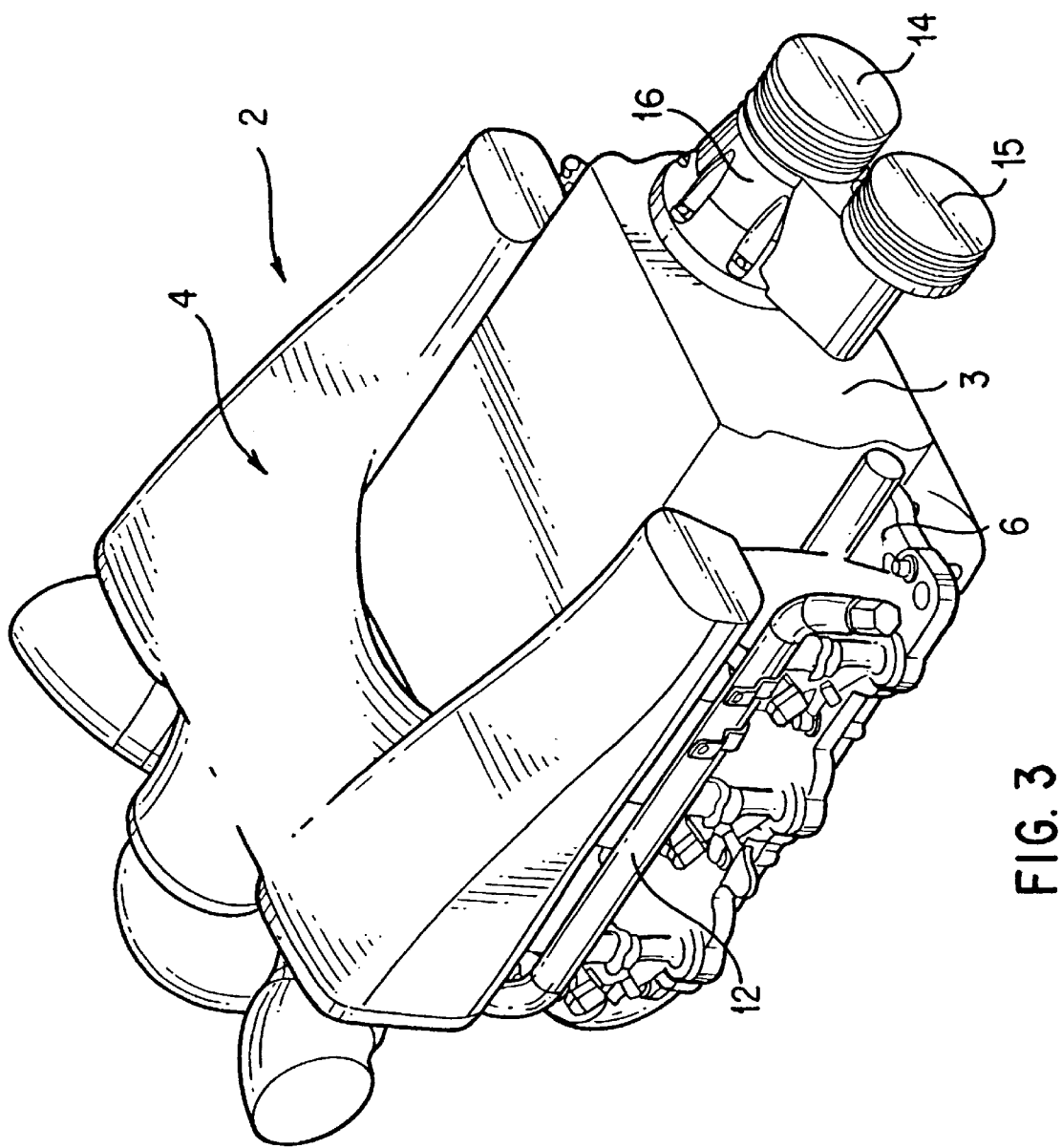
FIG. 3 shows a perspective view of the supercharger module.

It can be seen from the perspective representation according to FIG. 3 that the supercharger module 2 also comprises a fuel line 12.

Figure 4:
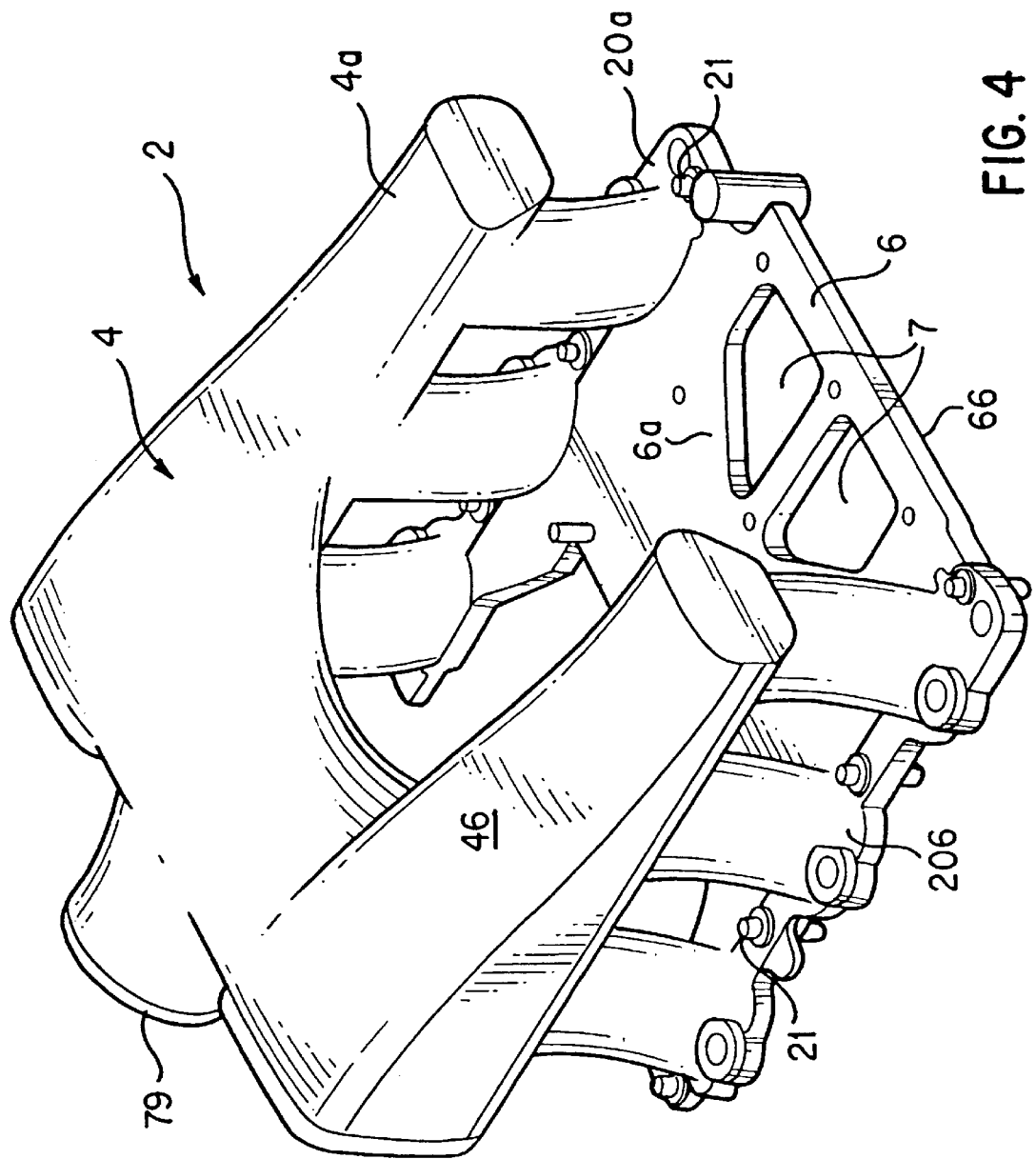
FIG. 4 shows the support plate of the supercharger module including intake manifold.

FIG. 4 shows the supercharger module 2 with the support plate 6 and the intake manifold 4, but without the supercharger. The intake manifold 4, to which compressed combustion air is fed via the inlet side 19, consists of two sections 4a and 4b which are each assigned to a cylinder bank and are arranged on an intake-manifold flange 20a and 20b respectively. The intake-manifold flanges 20a and 20b, which run on both longitudinal sides of the support plate 6, are integrally cast on the support plate. The module is screwed to the cylinder heads of the engine via screws 21.

The support plate 6 has two adjacent openings 7. The supercharger 3, arranged in the intermediate space between the two sections 4a, b of the intake manifold 4, and on the top side 6a of the support plate 6, communicates with the charge-air cooler underneath, which is arranged on the underside 6b of support plate 6.

Figure 5:
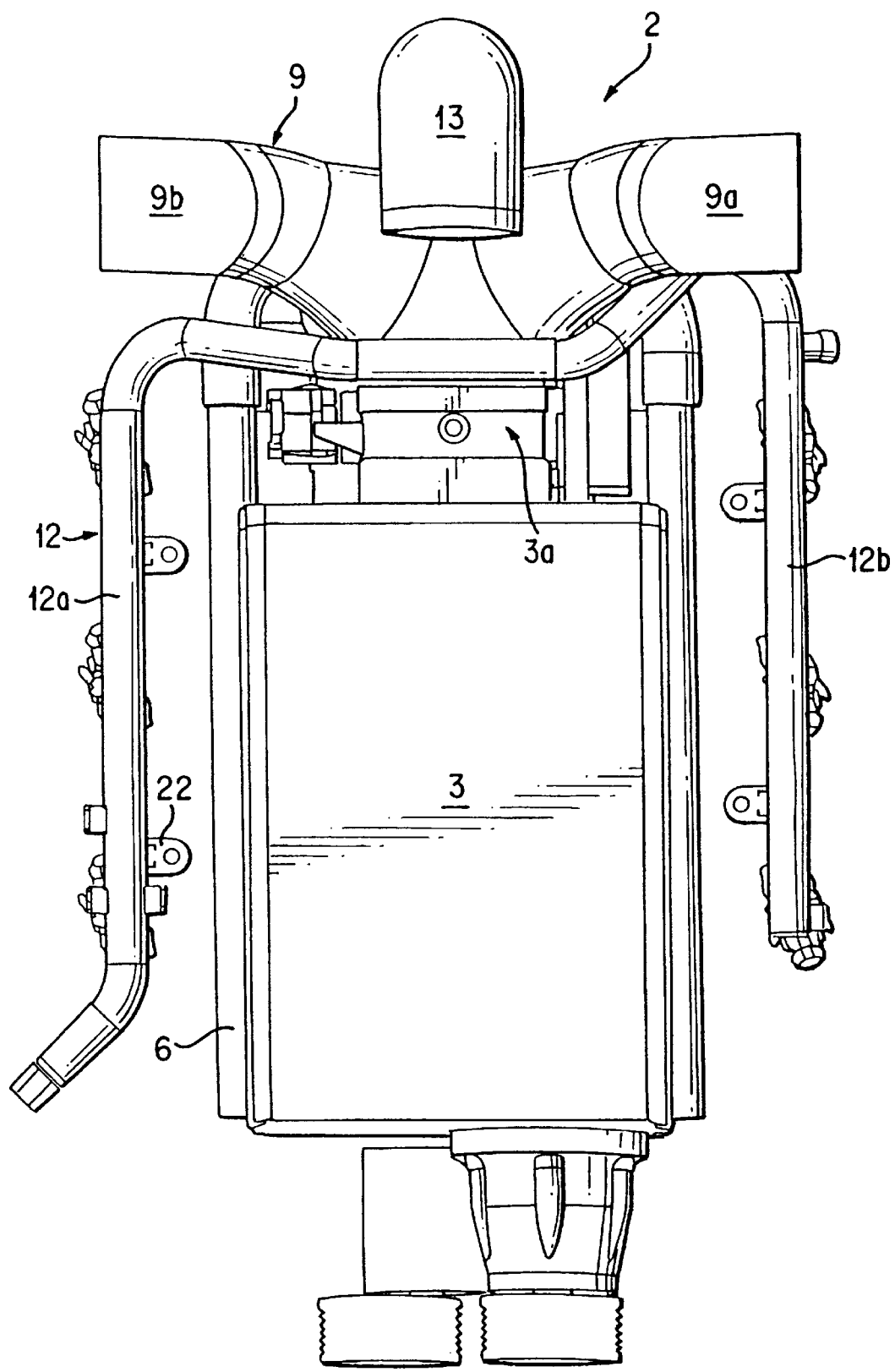
FIG. 5 shows a plan view of the supercharger module without intake manifold.

According to FIG. 5, the fuel line 12 consists of sections 12a, b, which like the two intake-manifold sections, run parallel to the longitudinal sides of the support plate 6 or the supercharger 3 respectively and are each assigned to a cylinder bank. The two sections 12a, b of the fuel line branch off from a centre section 12c. Fastening lugs 22 for fastening to the supercharger module are arranged on the lateral sections of the fuel line.

The throttle valve 11 of the internal combustion engine is arranged in the region of the admission side 3a of the supercharger 3, into which admission side 3a the air ducting sections 9a, b of the air ducting line 9 branching off from the air filter lead. The throttle valve 11 is likewise a component of the supercharger module 2.

Figure 6:
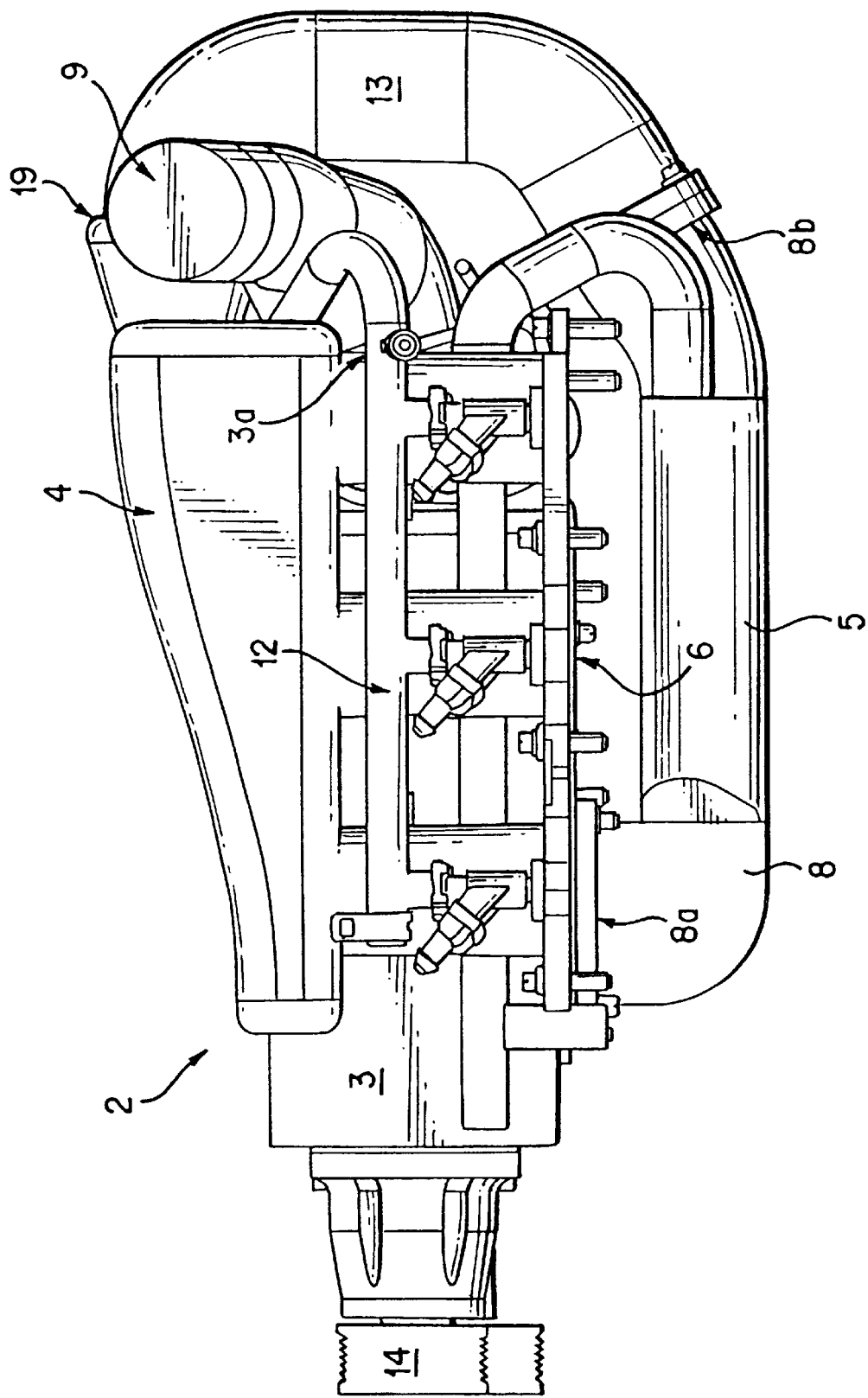
FIG. 6 shows a side view of the supercharger module.

The air ducting of the combustion air in the supercharger module 2 can be seen from FIG. 6. The combustion air cleaned in the air filter is passed through the air ducting line 9 and enters the supercharger 3 via the air-admission side 3a. The supercharger 3 is driven via its driving pulley 14 by the auxiliary-unit drive and compresses the combustion air. The compressed air is directed via the outlet side 3b of the supercharger 3 through the openings 7 (FIG. 4) in the support plate 6. Compressed air passes via an air inlet 8a into an air box 8 of the water-type charge-air cooler 5 on the underside of the support plate 6. After cooling, the compressed air leaves the air box 8 of the charge-air cooler 5 via the outlet side 8b. Outlet side 8b is connected to the second air ducting line 13, and air is passed through the air ducting line 13. That pipe section of the air ducting line 13 which is opposite the charge-air cooler 5 is connected to the inlet side 19 of the intake manifold 4. The second air ducting line 13 is directed around an end face of the support plate 6 and connects the charge-air cooler 5 arranged underneath to the intake manifold 4 arranged on top.

Figure 7:
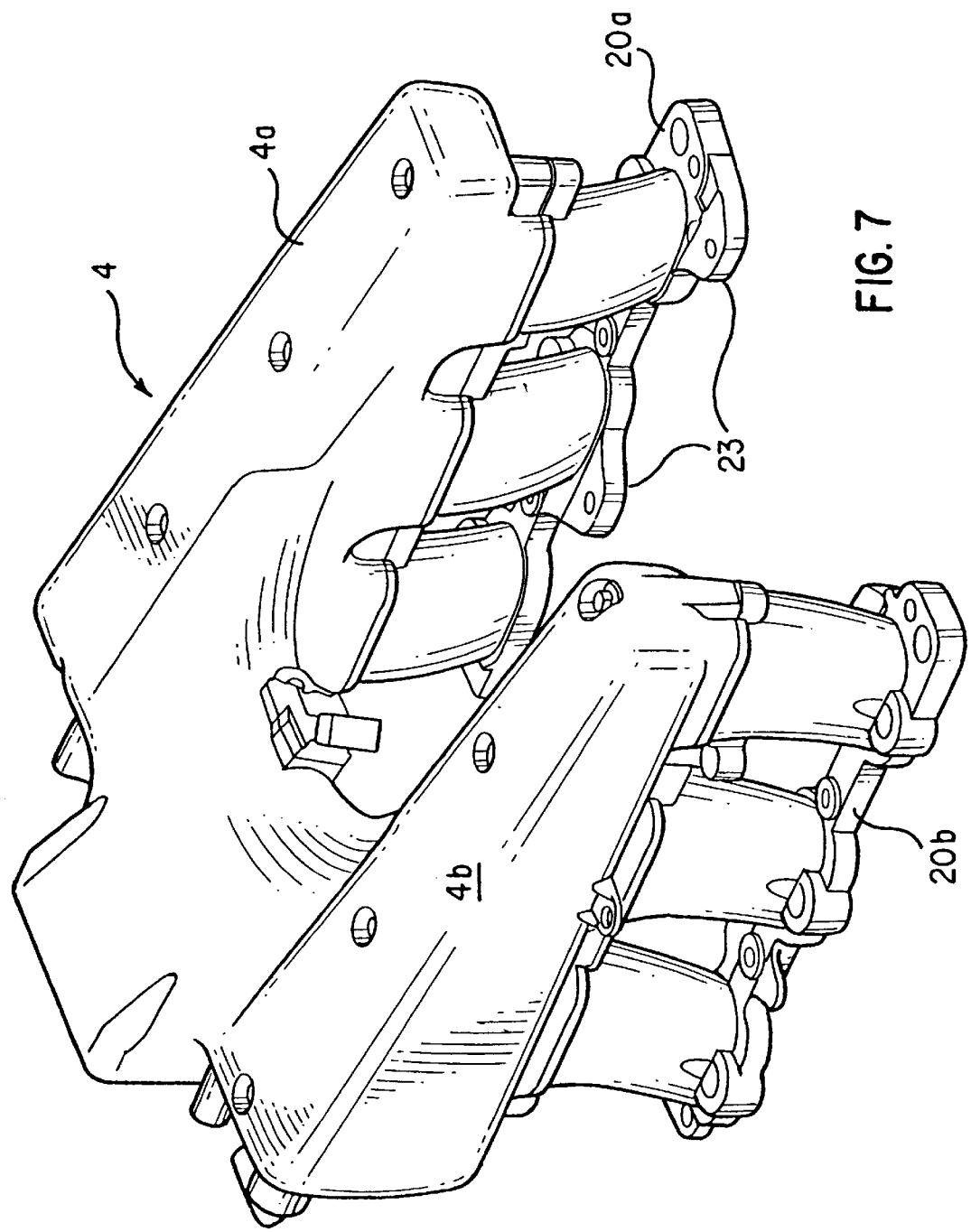
FIG. 7 shows a perspective view of the intake manifold.

FIG. 7 shows the intake manifold 4 with the two lateral sections 4a, 4b. Assigned to the sections 4a, 4b are the flanges 20a, b, which have fastening lugs 23, at which the supercharger module can be fastened to the intake manifold.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An internal combustion engine having a mechanical supercharger for compressing combustion air in an intake manifold, the supercharger communicating with a charge-air cooler arranged downstream in a flow direction of the combustion air and is connected to the intake manifold, wherein the supercharger, the charge-air cooler and the intake manifold form an interchangeable supercharger module positioned on a support plate.

2. An internal combustion engine according to claim 1, wherein the supercharger and the charge-air cooler are arranged on different sides of the support plate, an outlet side of the supercharger communicating with an inlet side of the charge-air cooler via an opening in the support plate.

3. An internal combustion engine according to claim 2, wherein an air ducting line is provided on the supercharger module on the admission side of the supercharger for the connection to an air filter of the internal combustion engine.

4. An internal combustion engine according to claim 3, wherein a second air ducting line is provided on the supercharger module between the charge-air cooler and the intake manifold.

5. An internal combustion engine according to claim 2, wherein a fuel line is arranged on the supercharger module.

6. An internal combustion engine according to claim 2, wherein the intake manifold is held on a flange which is connected to the support plate.

7. An internal combustion engine according to claim 1, wherein the charge-air cooler is fastened directly to the supercharger.

8. An internal combustion engine according to claim 7, wherein an air ducting line is provided on the supercharger module on the admission side of the supercharger for the connection to an air filter of the internal combustion engine.

9. An internal combustion engine according to claim 8, wherein a second air ducting line is provided on the supercharger module between the charge-air cooler and the intake manifold.

10. An internal combustion engine according to claim 7, wherein a fuel line is arranged on the supercharger module.

11. An internal combustion engine according to claim 7, wherein the intake manifold is held on a flange which is connected to the support plate.

12. An internal combustion engine according to claim 1, wherein an air ducting line is provided on the supercharger module on the admission side of the supercharger for the connection to an air filter of the internal combustion engine.

13. An internal combustion engine according to claim 12, wherein a second air ducting line is provided on the supercharger module between the charge-air cooler and the intake manifold.

14. An internal combustion engine according to claim 13, wherein the second air ducting line is directed in the region of an end face of the support plate between an underside and a top side of the support plate.

15. An internal combustion engine according to claim 12, wherein a fuel line is arranged on the supercharger module.

16. An internal combustion engine according to claim 15, wherein a second air ducting line is provided on the supercharger module between the charge-air cooler and the intake manifold.

17. An internal combustion engine according to claim 12, wherein the intake manifold is held on a flange which is connected to the support plate.

18. An internal combustion engine according to claim 17, wherein a second air ducting line is provided on the supercharger module between the charge-air cooler and the intake manifold.

19. An internal combustion engine according to claim 12, wherein a second air ducting line is provided on the supercharger module between the charge-air cooler and the intake manifold.

20. An internal combustion engine according to claim 12, wherein a throttle valve is arranged on the supercharger module on the admission side of the supercharger.

21. An internal combustion engine according to claim 20, wherein a fuel line is arranged on the supercharger module.

22. An internal combustion engine according to claim 21, wherein a second air ducting line is provided on the supercharger module between the charge-air cooler and the intake manifold.

23. An internal combustion engine according to claim 20, wherein the intake manifold is held on a flange which is connected to the support plate.

24. An internal combustion engine according to claim 23, wherein a second air ducting line is provided on the supercharger module between the charge-air cooler and the intake manifold.

25. An internal combustion engine according to claim 20, wherein a second air ducting line is provided on the supercharger module between the charge-air cooler and the intake manifold.

26. An internal combustion engine according to claim 1, wherein a fuel line is arranged on the supercharger module.

27. An internal combustion engine according to claim 26, wherein the intake manifold is held on a flange which is connected to the support plate.

28. An internal combustion engine according to claim 1, wherein the intake manifold is held on a flange which is connected to the support plate.

29. A method for assembling a mechanical supercharger on an internal combustion engine comprising the steps of:

positioning a supercharger on a support plate arranged to compress air from an intake manifold;

positioning a charge-air cooler on the support plate arranged in a flow direction downstream of the supercharger; and arranging the supercharger, charge-air cooler and intake manifold on the support plate to form an interchangeable module.

30. An interchangeable supercharger module for use on an internal combustion engine comprising a mechanical supercharger for compressing combustion air in an intake manifold, the supercharger communicating with a charge-air cooler arranged downstream in a flow direction of the combustion air and is connected to the intake manifold, wherein the supercharger, the charge-air cooler and the intake manifold form an interchangeable supercharger module positioned on a support plate.

* * * * *